US012699259B2

(12) United States Patent
Doubek et al.

(10) Patent No.: US 12,699,259 B2
(45) Date of Patent: Aug. 4, 2026

(54) MICROSCOPE COMPRISING EXCITATION RADIATION FROM A LIGHT SOURCE AND IMAGING METHOD FOR A MICROSCOPE

(71) Applicant: Carl Zeiss Meditec AG, Jena (DE)

(72) Inventors: Ralf Doubek, Langenau (DE); Felicia Walz, Schorndorf (DE)

(73) Assignee: Carl Zeiss Meditec AG, Jena (DE)

( * ) Notice: Subject to any disclaimer, the term of this patent is extended or adjusted under 35 U.S.C. 154(b) by 601 days.

(21) Appl. No.: 18/100,880

(22) Filed: Jan. 24, 2023

(65) Prior Publication Data

US 2024/0069316 A1     Feb. 29, 2024

(30) Foreign Application Priority Data

Feb. 7, 2022    (DE) .......................... 102022102763.5

(51) Int. Cl.
G02B 21/06 (2006.01)
G01N 21/27 (2006.01)
(Continued)

(52) U.S. Cl.
CPC ......... G02B 21/06 (2013.01); G01N 21/6458 (2013.01); G02B 21/16 (2013.01); (Continued)

(58) Field of Classification Search
CPC ........................ G02B 21/082; A61B 2090/304
See application file for complete search history.

(56) References Cited

U.S. PATENT DOCUMENTS 6,300,639 B1    10/2001  Wiederhoeft
7,498,561 B2     3/2009  Mehner et al.
(Continued)

FOREIGN PATENT DOCUMENTS

CN         211934007 U  * 11/2020  ............. G02B 27/10
DE         197 02 753 A1    7/1998
(Continued)

OTHER PUBLICATIONS

Oct. 12, 2022 German Office Action issued in German Application No. 10 2022 763.5. (10 pp.).

*Primary Examiner* — Paul C Lee
(74) *Attorney, Agent, or Firm* — NIXON PEABODY LLP; Jeffrey L. Costellia

(57)                ABSTRACT

The present disclosure relates to a microscope and to an imaging method for a microscope. The microscope according to the invention comprises an illumination beam path, which is configured to couple excitation radiation from a light source onto an object to be examined; an optical filter, which is configured to select parts of the excitation radiation; a sensor for detecting an optical property of the excitation radiation; a measurement beam path (90), which is configured to guide a part of the excitation radiation onto the sensor; an observation beam path, which is configured to image radiation emitted by the object; wherein the optical filter is arranged in the beam path between the light source and the sensor, and an image generating means, which is configured to generate an image from the radiation emitted by the object and guided in the observation beam path; wherein the image generating means is configured to use the properties of the filtered excitation radiation that are detected by means of the sensor for the image generation.

15 Claims, 10 Drawing Sheets

(51) Int. Cl.

| | |
|---|---|
| *G01N 21/64* | (2006.01) |
| *G02B 21/00* | (2006.01) |
| *G02B 21/16* | (2006.01) |
| *G02B 21/36* | (2006.01) |

(52) U.S. Cl.
CPC ......... *G02B 21/367* (2013.01); *G01N 21/274* (2013.01); *G01N 2021/6471* (2013.01); *G02B 21/0012* (2013.01)

(56) References Cited

U.S. PATENT DOCUMENTS

| | | | |
|---|---|---|---|
| 8,154,797 B2 | 4/2012 | Steffen et al. | |
| 2019/0278071 A1* | 9/2019 | Gögler | G02B 21/16 |
| 2022/0099577 A1* | 3/2022 | Harms | G02B 21/0076 |
| 2023/0074634 A1 | 3/2023 | Albrecht et al. | |

FOREIGN PATENT DOCUMENTS

| | | | |
|---|---|---|---|
| DE | 198 29 944 C2 | 3/2002 | |
| DE | 103 32 064 A1 | 1/2005 | |
| DE | 10 2006 047 723 A1 | 2/2008 | |
| DE | 10 2020 102 476 A1 | 8/2021 | |
| WO | WO-2020157265 A1 * | 8/2020 | H04N 23/56 |

* cited by examiner

------ Absorption Fluorophore 190   ——— Light source 200

——— Filter characteristic curve 210

········ Absorption Fluorophore 190        ----- Detection characteristic curve 191

─ · ─ Transmission light guide 192        ─ ─ Reflection + Transmission beam splitter 193

───── Light source 200        ───── Filter characteristic curve 210

MICROSCOPE COMPRISING EXCITATION RADIATION FROM A LIGHT SOURCE AND IMAGING METHOD FOR A MICROSCOPE

CROSS-REFERENCE TO RELATED APPLICATIONS

The present application claims priority under 35 U.S.C. § 119 to German Patent Application No. 102022102763.5, filed Feb. 7, 2022, the contents of which are incorporated by reference herein in their entirety.

SUBJECT MATTER OF THE INVENTION

The present invention relates to a microscope and to an imaging method for a microscope, in particular to a surgical microscope for fluorescence imaging. The present invention furthermore relates to a computer program for carrying out the method according to the invention in the microscope according to the invention and to the use of an optical filter for calibrating the microscope according to the invention.

TECHNOLOGICAL BACKGROUND

The use of technological aids is part and parcel of modern medicine. Imaging methods and robotic systems for guiding medical instruments are used equally as a matter of course in both surgery and diagnostics. In this context, the use of imaging methods allows the discrimination of various structures in the patient and the image data obtained in the process can be used advantageously in diagnostics and also in therapeutic and surgical methods.

A large number of medical interventions can be aided by a surgical microscope. In particular, image information obtained during the operation can be represented (overlaid) with diagnostic image data obtained in advance in order to indicate poorly visible tissue boundaries, blood flow information or other fluorescence information to the surgeon. Likewise, robotic surgical instruments can be controlled or certain operations can be performed in partly or fully automated fashion on the basis of the image data. In this case, surgical microscopes are used in particular in minimally invasive surgery and in microsurgery.

For the abovementioned applications and in particular for the imaging of otherwise poorly visible tissue and tissue boundaries by means of fluorescence excitation, a correct calibration of the microscope is of critical importance. For example, fluorescence light emitted by the tissue is dependent on the excitation conditions, in particular on the intensity and the spectrum of the light source used for the excitation, but also on other influences and excitation conditions of the imaging optical system or (surgical) microscope.

Among other things, LED light sources are used to excite and illuminate the tissue. The efficiency of the typically used LEDs, however, is temperature-dependent and additionally drops over the course of their lifetimes. Moreover, the spectrum of the excitation light source may spectrally shift over time and depending on the temperature. The efficiency and spectrum of the light source can additionally depend on further factors, such as for example the current used to operate the light source. Further optical components present in the beam path, such as light guides, can also exhibit signs of aging, as a result of which both the intensity and also the spectral distribution of the light energy with which the tissue is irradiated may vary significantly.

However, to achieve exact fluorescence imaging, the accurate knowledge of both the intensity and the spectral distribution of the light with which the tissue is irradiated for fluorescence excitation is essential. These values, together with a characteristic for the quantum yield of the fluorescence excitation, serve as a basis for the representation of the fluorophore used and consequently also the actual imaging. As part of the present disclosure, the term fluorophore denotes both fluorescence substances and fluorescence markers and fluorophores introduced both externally (exogenous fluorophores) and fluorophores occurring naturally in the body (endogenous fluorophores).

A surgical microscope is known, for example, from DE102020102476A1. The surgical microscope is calibrated at pre-set illumination settings, so that in particular influences of the imaging optical system can be compensated.

In the prior art, a change in the radiation patterns of the excitation light source during operation can disadvantageously lead to a faulty calibration and consequently also to a faulty fluorescence representation, for example during the detection and representation of tumors. It is consequently necessary to regularly check the illumination spectrum or recalibrate the microscope. In addition, a variation in intensity and spectral distribution of the excitation light source cannot be compensated during use.

The object of the present invention is to overcome the disadvantages of the prior art and to provide an improved surgical microscope.

DESCRIPTION OF THE INVENTION

The object according to the invention is achieved by the subjects of the independent patent claims. Preferred developments are the subject matter of the dependent claims.

A first aspect of the present disclosure relates to a microscope. The microscope according to the invention has an illumination beam path configured for coupling excitation radiation from a light source onto an object to be examined. The light source is preferably a light source embodied for exciting fluorescence in a sample. The light source is preferably an LED. As an alternative, however, other light sources, for example xenon lamps, can be used in the microscope according to the invention. Rapidly aging light sources can advantageously also be used for illumination purposes in the microscope according to the invention. The light source is used only for exciting fluorescence or is used for exciting fluorescence among other things.

The microscope according to the invention furthermore has an optical filter configured for selecting part of the excitation radiation. In other words, the optical filter has a wavelength-dependent transmission or absorption (transmission filter) or reflection (reflection filter) or a mixture thereof. For example, the filter may be a bandpass filter, wherein the derivation of the filter properties will be explained in detail below. Within the context of the present disclosure, the optical filter is preferably a filter element or a combination of a plurality of filter elements. The at least one filter element is preferably embodied in the form of a transmission filter or reflection filter.

The microscope according to the invention furthermore has a sensor configured for detecting optical properties of the excitation radiation. This sensor preferably differs from a sensor of the microscope that is used for imaging. According to the invention, the optical filter is arranged in the beam path between the light source and the sensor. In this context, a light source is in particular understood to mean the actual light-emitting means, and said beam path between the light source and sensor can therefore also comprise portions within a housing around the actual light-emitting means. Consequently, the sensor detects the portion of the excitation radiation that is selected, preferably transmitted or reflected, by the optical filter. The arrangement of the sensor and filter in the microscope can vary, but the sensor captures the excitation light after its interaction with the optical filter, in particular after its passage through the optical filter, and before the interaction of the excitation light with the sample to be illuminated. Preferably, a plurality of sensors are used for detecting the optical properties of the excitation radiation. With particular preference, a plurality of sensors that are to be used alternatively or cumulatively are provided. An alternative use makes sense for example for detecting excitation radiation of various intensities. A cumulative use may make sense for detecting excitation radiation in different spectral ranges.

The microscope according to the invention furthermore has a measurement beam path, which is configured to guide part of the excitation radiation onto the sensor. The measurement beam path preferably guides the part of the excitation radiation that has been selected by the optical filter at least in part onto the sensor. In other words, the optical filter is preferably arranged in the measurement beam path, or the measurement beam path preferably begins at the optical filter. The measurement beam path serves for capturing properties of the excitation radiation before its interaction with the illuminated sample.

In the microscope according to the invention, furthermore an observation beam path is provided, which is configured for imaging radiation emitted by the object. In fluorescence microscopy or imaging, emitted fluorescence light is primarily used for the generation of images. However, the emitted light can also include, besides the radiation emitted by the object, reflected or scattered portions of the light used for excitation. An image generating means of the microscope according to the invention for generating an image from the radiation emitted by the object and guided in the observation beam path is embodied according to the invention to use the properties of the filtered excitation radiation detected by means of the sensor for image generation. In other words, in the microscope according to the invention, a sensor signal that has been generated by the optical sensor and characterizes properties of the excitation radiation is included in the image generation. Consequently, image generation preferably involves an image being produced on the basis of the radiation that has been emitted by the object and by taking into account the sensor signal generated by the optical sensor.

It is advantageously possible with the microscope according to the invention to compensate (in situ) during the image generation changes in properties of the excitation light occurring during operation, such as intensity, and/or spectral distribution. These changes can be traced back to the light source and also to optical components of the microscope in the illumination beam path. Compensating any fluctuations of the excitation light preferably takes place here with a great level of accuracy and still cost-effectively, in particular if the sensor for the optical properties of the excitation light used is a detector with a reducible or reduced number of channels. If the sensor signal indicates that the excitation light largely corresponds to that during a completed calibration, this is advantageously taken into consideration in the image generation by the image generation being carried out accordingly entirely without compensation (correction) or at least without any compensation and, for example, by using a previously determined correction value (preferably obtained from a comparison of a reference value and a previously determined effective value of the excitation).

In one preferred embodiment, the sensor is configured to determine the intensity of the excitation radiation in the measurement beam path. With particular preference, the sensor is configured to determine only the intensity of the excitation radiation in the measurement beam path. In other words, a sensor without any spectral resolution is preferably used as a sensor according to the invention for the excitation light. Such sensors are advantageously cost-effective and easy to use. It is preferred here that the sensor detects the light intensity and/or the illuminance of the excitation radiation that is incident on the sensor. Alternatively or additionally, other photometric variables may be used, such as for example luminous flux, luminance, light yield, light quantity, irradiance, flux density, number of photons and similar variables, which likewise allow a statement to be made about the energy or intensity that is incident on the sensor.

With further preference, the sensor has a broadband design and has for example a spectral absorption characteristic with a full width at half maximum (FWHM) of more than 10 nm, preferably more than 30 nm, and with particular preference more than 60 nm. Likewise with reference, at least 50%, with particular preference at least 80%, and with more preference at least 90%, of the light absorbed by the sensor has a wavelength in the range from 380 nm to 700 nm. In other words, the sensor according to the invention is preferably embodied to absorb visible light. It is likewise preferred, however, for the sensor according to the invention to be embodied, in addition or as an alternative, to detect light in the further spectral range, in particular light having wavelengths of up to 350 nm in the ultraviolet range or having wavelengths of up to 2200 nm in the (near) infrared range.

In one preferred embodiment, the optical filter is embodied in the form of a bandpass filter. The spectral filter characteristic, preferably the transmission or reflection characteristic, is preferably embodied with a full width at half maximum (FWHM) of less than 300 nm, more preferably less than 200 nm, and with particular preference less than 100 nm. With particular preference, the bandwidth and the band position of such a bandpass filter corresponds to the absorption spectrum of the fluorophore used for imaging the object. It is thus possible to ensure that only the part of the excitation light that contributes to the fluorescence excitation is detected with the sensor. In other words, the filter replaces according to the invention a spectral evaluation in the sensor. The fluorophore is preferably a medically approved fluorophore, such as protoporphyrin IX (PpIX), fluorescein or indocyanine green. These fluorophores generally have an extended spectral range that contributes to the fluorescence excitation. The spectral filter characteristic, preferably transmission or reflection characteristic, of the sensor therefore preferably has a full width at half maximum of greater than 5 nm, preferably greater than 15 nm, and with particular preference greater than 25 nm.

In the microscope according to the invention, the filter is preferably adapted to the respective application, in particular to the effective excitation spectrum of a fluorophore present in the object. The effective excitation spectrum is based here preferably on the absorption spectrum and also on the spectral excitation efficiency of the fluorophore. It is likewise preferred for the filter, in particular the filter characteristic, to be adapted to the effective excitation spectrum of a plurality of fluorophores contained in the sample. In this way, the filter selects according to the invention the light that contributes to the fluorescence excitation from the excitation radiation, as a result of which a calibration of the fluorescence imaging can take place solely based on an intensity measurement of the selected excitation radiation. It is likewise preferred for a plurality of filters to be used or for the filter to be formed from a plurality of filter elements. In this case, a plurality of filters or filter elements may possibly also be used for an individual fluorophore.

For example, provision may be made for a plurality of fluorophores to be contained in a sample, with the excitation spectra of the fluorophores clearly differing or being delineable from one another. For example, a first fluorophore in a sample is excited to fluorescence at wavelengths around 400 nm, and a second fluorophore in the same sample is excited to fluorescence at wavelengths around 800 nm, while a cross excitation (that is to say fluorophore 1 at $\lambda \sim 800$ nm and fluorophore 2 at $\lambda \sim 400$ nm) is negligible. In this case, the filter, in particular the filter characteristic, is preferably adapted to the effective excitation spectrum of both fluorophores, while the excitation of the individual fluorophores is controlled via the excitation radiation. To this end, two separate light sources or one modulable light source may be provided. According to this embodiment, a broadband sensor with which the filtered excitation radiation of both around 400 nm and also around an 800 nm is detectable is preferably additionally provided. The sensor is preferably controllable for the individual measurement of each of the plurality of fluorophores, wherein the measurement can take place either individually or at the same time.

The filter, in particular the filter characteristic, is further preferably adapted to the optical properties of the optical elements contained in the excitation beam path of the microscope. These too filter and manipulate the excitation radiation in the microscope and consequently have an influence on the excitation radiation that actually contributes to fluorescence. This influence is preferably also simulated in the microscope according to the invention by way of the filter. Simulating the optical properties of the optical elements contained in the excitation beam path of the microscope by way of the filter is necessary in particular if the sensor is arranged near the light source. However, if the optical sensor is located close to the object, that is to say more at the end of the excitation beam path, the optical properties of the optical elements contained in the excitation beam path of the microscope have already modulated the excitation radiation, and the corresponding information is therefore already intrinsically contained in the excitation radiation. In that case, a simulation of the absorption and/or excitation efficiency (effective absorption) of at least one fluorophore is generally sufficient. With particular preference, only non-aging optical components of the microscope are simulated by the filter, such as for example coatings causing characteristic peaks in the beam path. If the optical properties of the optical components are, however, subject to aging themselves, a time-dependent component of the filter would be necessary and intrinsic incorporation at the end of the excitation beam path is preferred. The same is true with regards to any temperature dependence of the optical properties of the optical components.

Likewise with preference, the filter, in particular the filter characteristic, is adapted to a spectral sensitivity of the sensor used. Since the sensor measures merely an intensity, with particular preference without spectral resolution in the entire spectral bandwidth, a spectrally varying sensor sensitivity may falsify the captured signal. If the sensor has, for example, a characteristic according to which white noise of a specific intensity is captured at different wavelengths with different sensitivity, the measured intensity in the entire bandwidth represents a weighted summation. With particular preference, the sensor has a filter characteristic that has been adapted to said sensor characteristic, preferably to the inverse sensor characteristic. In this way, any influence of the sensor can be compensated. With particular preference, the filter has a filter characteristic that is based on the inverse sensor characteristic and the absorption spectrum of a fluorophore.

As already stated, the filter characteristic (for example the spectral transmission characteristic or reflection characteristic) of the optical filter is preferably adapted to the (effective) absorption spectrum of the fluorophore. Within the context of the present disclosure, this means that a deviation of the spectra per wavelength is preferably less than 35%, with further preference less than 25%, likewise preferred less than 15%, particularly preferably less than 10% and more preferably less than 5%. Such consideration requires identical normalization of the filter characteristic of the filter and (effective) absorption spectrum of the fluorophore. With further preference, an adaptation of the filter characteristic and absorption spectrum exists if the area under the (normalized, effective) absorption spectrum of the fluorophore deviates from the area under the (normalized) filter characteristic by less than 35%, with further preference less than 25%, likewise preferred less than 15%, more preferably less than 10% and particularly preferably less than 5%. In this way, the filter characteristic can be adapted for example to an envelope of the absorption spectrum. The same is true for adaptation of the filter characteristic to the optical properties of further optical elements in the excitation beam path or to the sensor characteristic of the sensor. In these cases, the filter characteristic is adapted with respect to a resultant characteristic obtained for example by convolution of the absorption characteristic of the fluorophore, an inverse sensor characteristic of the sensor, and characteristics of the optical elements.

In a further preferred embodiment, the filter and the sensor are arranged in the immediate vicinity of one another. Preferably, no further beam shaping optical components lie between the filter and sensor. Preferably, the distance between the filter and sensor is smaller than the focal length of the objective used in the microscope. It is likewise preferred for the filter and/or sensor to be arranged in a region in which the excitation radiation, or the part of the excitation radiation that is guided in the measurement beam path, has the greatest possible collimation, that is to say angle deviations between the individual rays of the excitation radiation are as small as possible. As a result, anisotropies of the filter effect or sensor capturing that depend on the angle of incidence can be avoided.

In one preferred embodiment, the optical filter is formed by a multiplicity of individual, for example disk-type, filter elements. Preferably, individual, for example disk-type, filter elements are arranged directly one behind the other. It is likewise preferred for the microscope according to the invention to have a plurality of filters. In this case, individual filters of the plurality of filters are preferably adapted in each case to a fluorophore. The plurality of filters are arranged for example in a filter wheel so as to be selectable and are combined with a broadband sensor. It is likewise preferred for the microscope according to the invention to have a plurality of rather narrowband sensors, for example in each case in combination with one of the plurality of filters.

It is likewise preferred for the microscope according to the invention to have a plurality of filters, wherein the plurality of filters overall is adapted to the (effective) absorption characteristic of a fluorophore. For example, an individual filter or an individual filter element is provided for a left flank and a further individual filter or individual filter element is provided for a right flank of the (effective) absorption spectrum of the fluorophore.

The light source is preferably embodied to be spectrally broadband. By way of example, a spectral emission characteristic of the light source preferably has a full width at half maximum (FWHM) of more than 10 nm, preferably more than 30 nm, and with particular preference more than 60 nm. With further preference, at least 50%, with particular preference at least 80%, and with particular preference at least 90%, of the light emitted by the light source lies in the spectral range from 380 nm to 700 nm, or in other words the light source emits visible light. Likewise with preference, the light source, however, additionally or alternatively also covers other spectral ranges, in particular wavelengths of up to 350 nm in the ultraviolet range or wavelengths of up to 2200 nm in the near infrared or infrared range. In one preferred embodiment, the microscope has a multiplicity of light sources, wherein it is possible to assign each of the light sources individually an adapted filter and a detector. Alternatively, and if the excitation radiation of the plurality of light sources is guided in a common beam path, it is preferred for a common filter and an associated detector to be provided.

However, the light source can preferably also be a narrowband light source, for example a laser. Laser light is frequently used to excite fluorophores because at least for some fluorophores, lasers with a wavelength that corresponds well with the absorption spectrum can be provided. In this case, the microscope according to the invention also enables detection of the part of the excitation radiation that effectively contributes to the excitation. In this case, it is preferred for the sensor signal to be used not only for image generation, but also for open-loop and/or closed-loop control of the laser source and/or of other components in the microscope (for example stops etc.).

In one preferred embodiment of the microscope according to the invention, the microscope has a control unit that is configured to control in open-loop or closed-loop fashion the light source and/or other components depending on the sensor signal. This preferably comprises the closed-loop control or open-loop control of a temperature or of a supply current of the light source. Likewise preferably, this comprises the open-loop or closed-loop control of further components, such as stops or filters (for example by means of filter tilting). According to this embodiment, the control unit comprises preferably the image generating means, or the latter is a subcomponent of the control unit.

In one preferred embodiment, the measurement beam path is configured to couple a part of the excitation radiation out of the illumination beam path. In this case, it is preferred for merely a small part of less than 10%, particularly preferably less than 5%, and with further preference of less than 1%, of the excitation light to be coupled out into the measurement beam path. Consequently, the excitation power of the actual measurement signal is advantageously nearly retained and a high image quality may be realized despite the measurement of at least one part of the excitation light that is necessary to compensate for any fluctuations in the excitation light. Excitation light is preferably coupled out in the measurement beam path by way of a partially transmissive mirror or a beam splitter. Consequently, a compact construction can advantageously be made possible.

With further preference, a means for light homogenization is provided in the measurement beam path. The means for light homogenization is preferably an integrating sphere.

Thereby, spatial inhomogeneities of the excitation radiation can be advantageously reduced. This advantageously enables the use of a simple and cost-effective sensor. Alternatively, however, spatial inhomogeneities of the excitation radiation are also preferably captured, for example, by the sensor for capturing the optical properties of the filtered excitation radiation being configured as a sensor array or a pixel detector for capturing a two-dimensional distribution of the filtered excitation light. For this purpose, for example, a CCD sensor can be used. In summary, this enables the ascertainment of a matrix with effective values of the excitation light or, by comparison with a reference value of the excitation light, a matrix with correction factors for the excitation light. This embodiment advantageously also enables the representation or compensation of spatial inhomogeneities of the excitation light, as a result of which a calibration, for example with a white target, possibly becomes superfluous.

In one preferred embodiment, the image generating means has a camera. In this case, the observation beam path is preferably configured to image the object onto a light-sensitive detector plane of the camera. The light-sensitive detector of the camera is preferably embodied in the form of a CMOS sensor or a CCD sensor. It is furthermore possible to provide a multiplicity of cameras for image detection.

In one preferred embodiment, the image generating means has an evaluation unit. The evaluation unit is preferably formed by hardware and/or software components. The evaluation unit is in particular configured to process the image data detected by the camera and to generate an image by using the detected, imaged radiation (intensity). It is preferred here for the evaluation unit to use the radiation intensity detected by the sensor to compensate any fluctuations in the excitation light that are caused for example by the aging of the light source and/or optical components, such as waveguides, with a great level of accuracy. This is advantageous in particular in fluorescence imaging because for example tissue boundaries or other fluorescence information can in this way be ascertained with a great level of accuracy and displayed despite the temporal variation of the optical system used.

In a particularly preferred implementation, the generation of the image by the evaluation unit and by using the radiation intensity detected by the sensor is continuous. The image of the object is detected and generated here continuously during the operation of the microscope. In this way, the property (intensity) of the filtered excitation radiation that is detected by means of the sensor will be used continuously for image generation, whereby an in-situ compensation of the temporally changing optical system is achieved. In one preferred embodiment, the microscope is configured to detect the optical property of the excitation radiation by means of the sensor and to generate an image by taking into account the detected properties of the filtered excitation radiation and radiation that is emitted by the object and guided in the observation beam path and detected.

The properties of an optical system generally do not change abruptly but gradually over time. The evaluation unit is therefore preferably configured to use the property (intensity) of the filtered excitation radiation detected by means of the sensor discontinuously to generate the image. A time interval within which the property of the excitation radiation is detected again and/or used again for image generation is preferably less than 10 minutes, with further preference less than 1 minute, and with particular preference less than 10 seconds.

In order to be able to effectively determine and compensate the variations within the optical system, such as intensity and spectrum of the light source, transmission spectrum of a waveguide, transmission spectrum of optical surfaces, etc., it is preferred that the property (intensity) of the filtered excitation radiation that is detected by means of the sensor is compared with a reference value that was ascertained previously under known excitation conditions. With particular preference, the evaluation unit is configured to computationally increase the brightness of the generated image if the ratio between the detected optical property of the excitation radiation and the reference value increases. With further preference, the evaluation unit is configured to computationally decrease the brightness of the image if the ratio between the detected optical property of the excitation radiation and the reference value decreases. With particular preference, a linear adaptation is effected in the ratio of the optical property (intensity) of the filtered excitation radiation that is detected by means of the sensor and the previously ascertained reference value.

A second aspect of the present disclosure relates to a method for generating an image of an object, wherein the method comprises the following steps: Initially, excitation radiation is generated, in particular excitation radiation that is suitable to excite fluorescence. In a further step of the method according to the invention, at least a part of the excitation radiation is coupled onto an object to be examined. Furthermore, a part of the excitation radiation is coupled out, wherein the coupled-out part of the excitation radiation is guided onto an optical filter. In the method according to the invention, a part of the coupled-out excitation radiation is selected by means of the optical filter, and optical properties of the filtered excitation radiation are detected by means of an optical sensor. Finally, in the method according to the invention, at least a part of the radiation emitted by the object is imaged, the imaged radiation is detected, and an image is generated by using both the detected, imaged radiation and also by using the detected optical property of the filtered excitation radiation. By taking into account the properties of the filtered excitation radiation during the image generation, the influence of the optical system, for example the light source, on the image generation is advantageously representable and preferably compensable.

In one preferred implementation, the method furthermore comprises determining an effective value for the excitation of the object to be examined. The effective value characterizes here preferably the fluorescence excitation in the object to be examined. This value is particularly preferably ascertained from the detected optical properties of the filtered excitation radiation, in particular the intensity thereof in a predetermined spectral range. The effective value is obtained, for example, by integrating the intensity in the relevant predetermined spectral range. According to this preferred implementation, the determined value is furthermore compared with a reference value, for example by forming a ratio between the two values. Finally, an image is generated by using the detected, imaged radiation and by using the comparison between the reference value and the effective value. Likewise with preference, a deviation of a currently ascertained effective value from a previously ascertained effective value is determined, and the currently ascertained effective value is used for image generation only if this deviation exceeds a predetermined limit value. In this way, a too frequent adaptation of an image generation is advantageously avoided.

In a preferred implementation of the method according to the invention, according to which the detected optical properties of the filtered excitation radiation are used to control, by open-loop control or closed-loop control, a light source of the excitation radiation and/or further components in a microscope used to generate images, a deviation of a currently detected optical property from a previously detected optical property is preferably determined and the light source and/or further components are re-adjusted by open-loop (or closed-loop) control only if this deviation falls below a predetermined limit value. In this way, a too frequent re-adjustment by open-loop (or closed-loop) control is advantageously avoided.

In a likewise preferred implementation, the method according to the invention furthermore comprises the use of an optical filter, whose spectral filter characteristic corresponds to the (effective) absorption spectrum of a fluorophore contained in the object. In a further preferred implementation, the method furthermore comprises the use of an optical filter, whose spectral filter characteristic corresponds to a product (a convolution) of the absorption spectrum of the fluorophore contained in the object and an inverse sensor characteristic. In a likewise preferred implementation, the method furthermore comprises the use of an optical filter whose spectral filter characteristic corresponds to a product (a convolution) of the absorption spectrum of the fluorophore contained in the object, to an inverse characteristic of the sensor used to detect the filtered excitation radiation, and to spectral characteristics of optical elements in the excitation beam path. The filter characteristic is preferably a transmission characteristic or a reflection characteristic.

Further preferred embodiments of the invention will become clear from the other features set out in the dependent claims. The various embodiments of the invention that are set forth in this application can advantageously be combined with one another, unless specifically stated otherwise.

DESCRIPTION OF THE FIGURES

The invention is explained below in illustrative embodiments and with reference to the attached drawings. In the drawings.

Figure 5A:
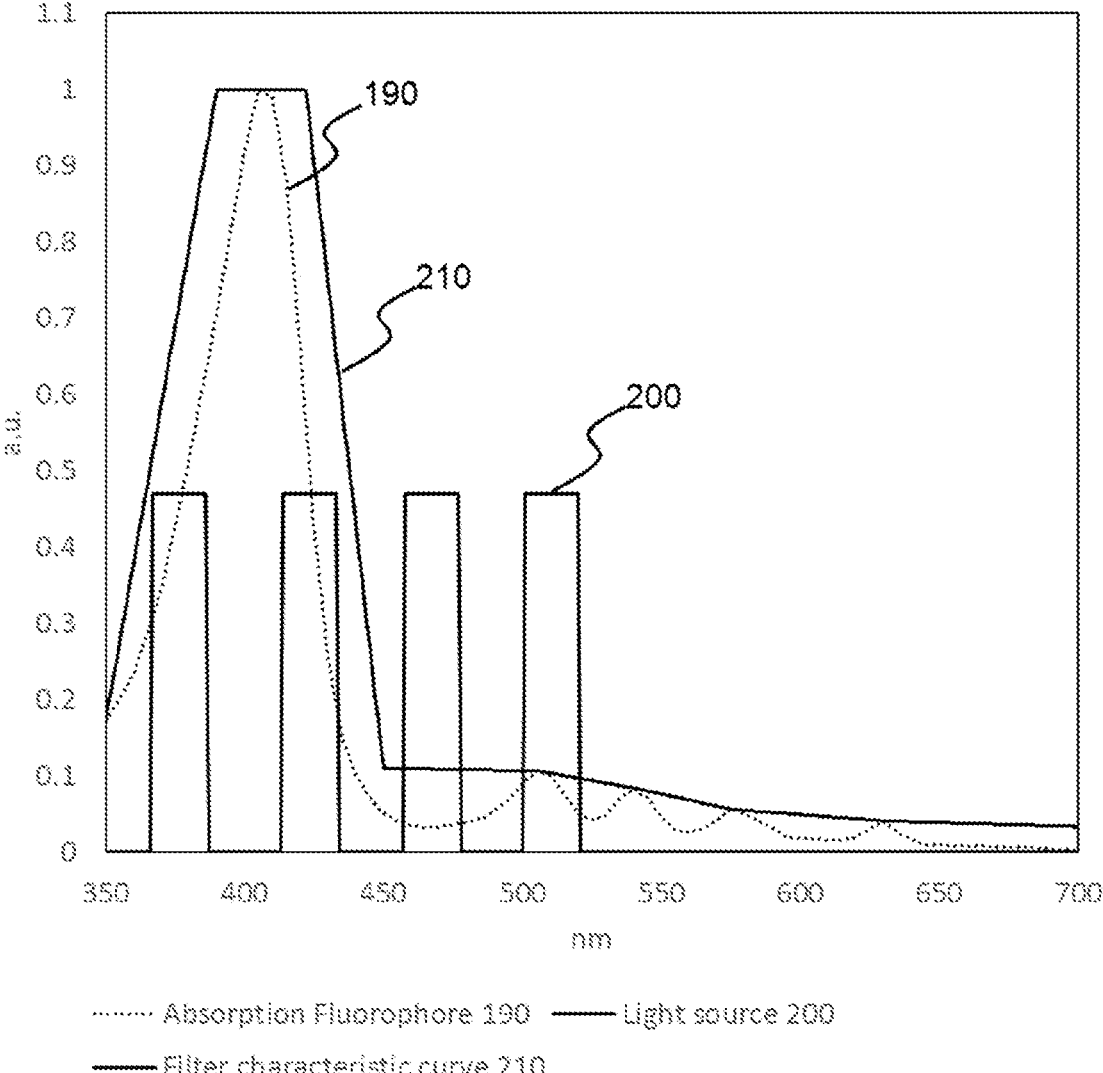
FIGS. 5A-5D shows schematic illustrations of characteristics of the optical filter used in the microscope according to the invention in accordance with embodiments, wherein in FIG. 5(A) the filter characteristic corresponds to an envelope of the absorption spectrum of protoporphyrin IX (PpIX), in FIG. 5(B) the filter characteristic is based on the absorption spectrum of protoporphyrin IX (PpIX) and the sensor's spectral sensitivity, in FIG. 5(C) the filter characteristic is based on the absorption spectrum of protoporphyrin IX (PpIX), the sensor's spectral sensitivity, the transmission characteristic of a light guide, and the reflection and transmission properties of a beam splitter, and wherein FIG.
Figure 5B:
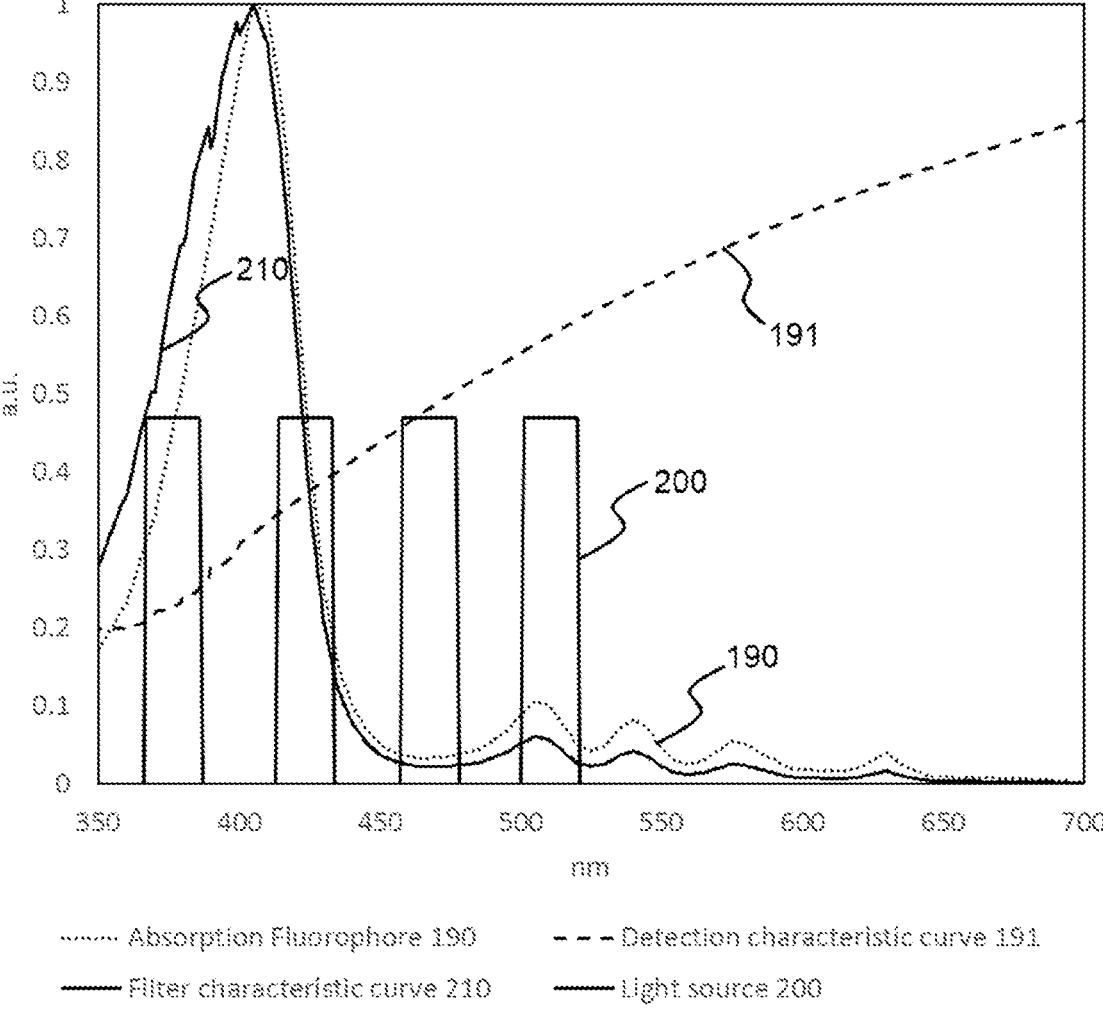
Figure 5C:
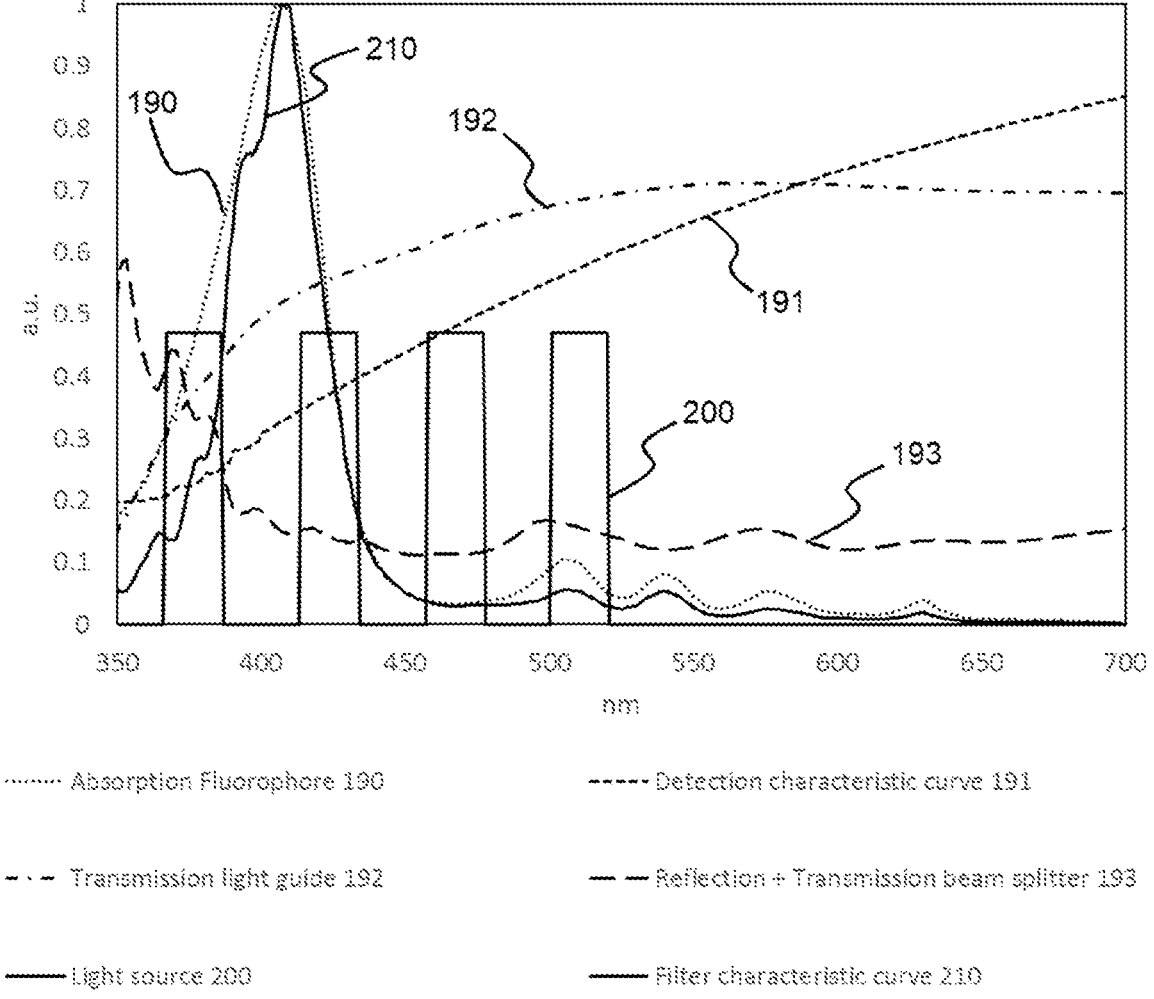
Figure 6:
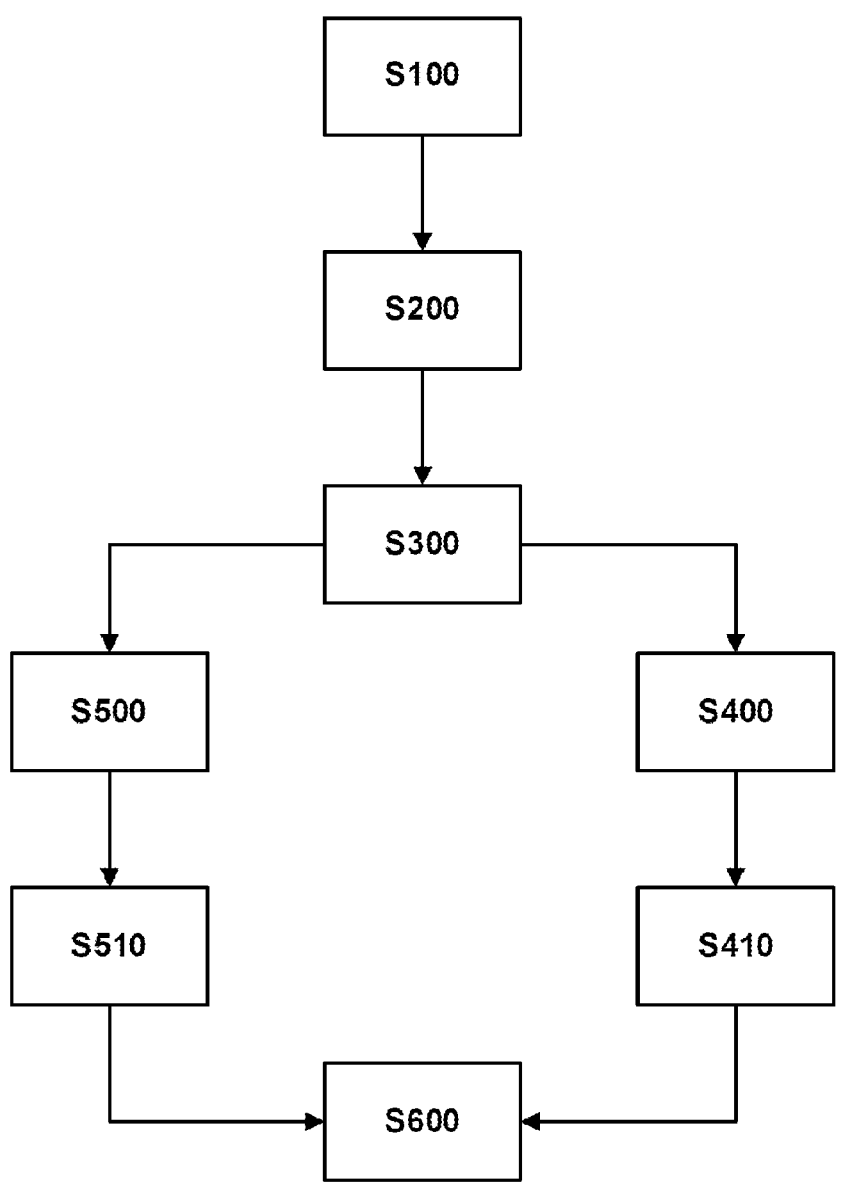
Figure 7:
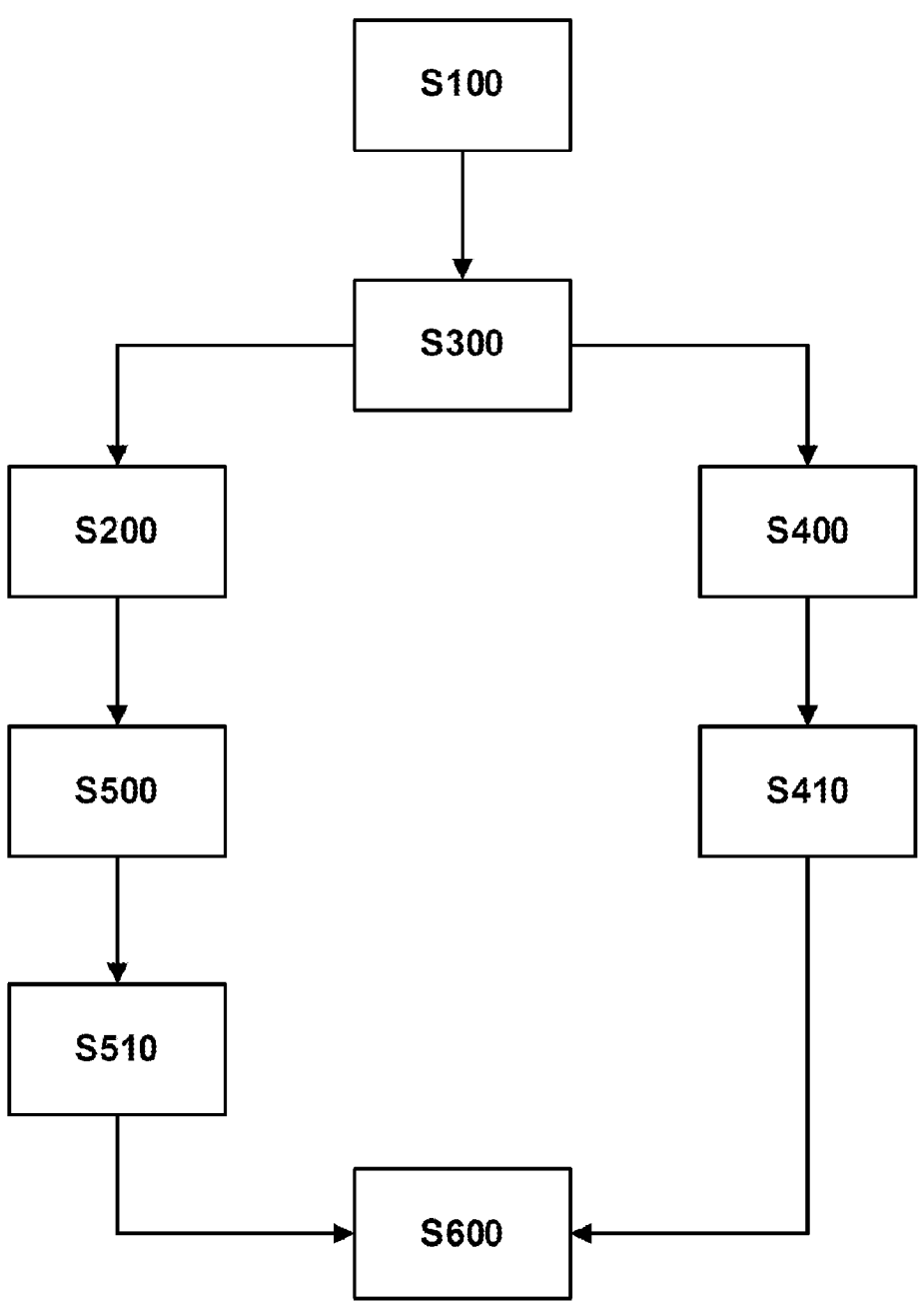
Figure 8:
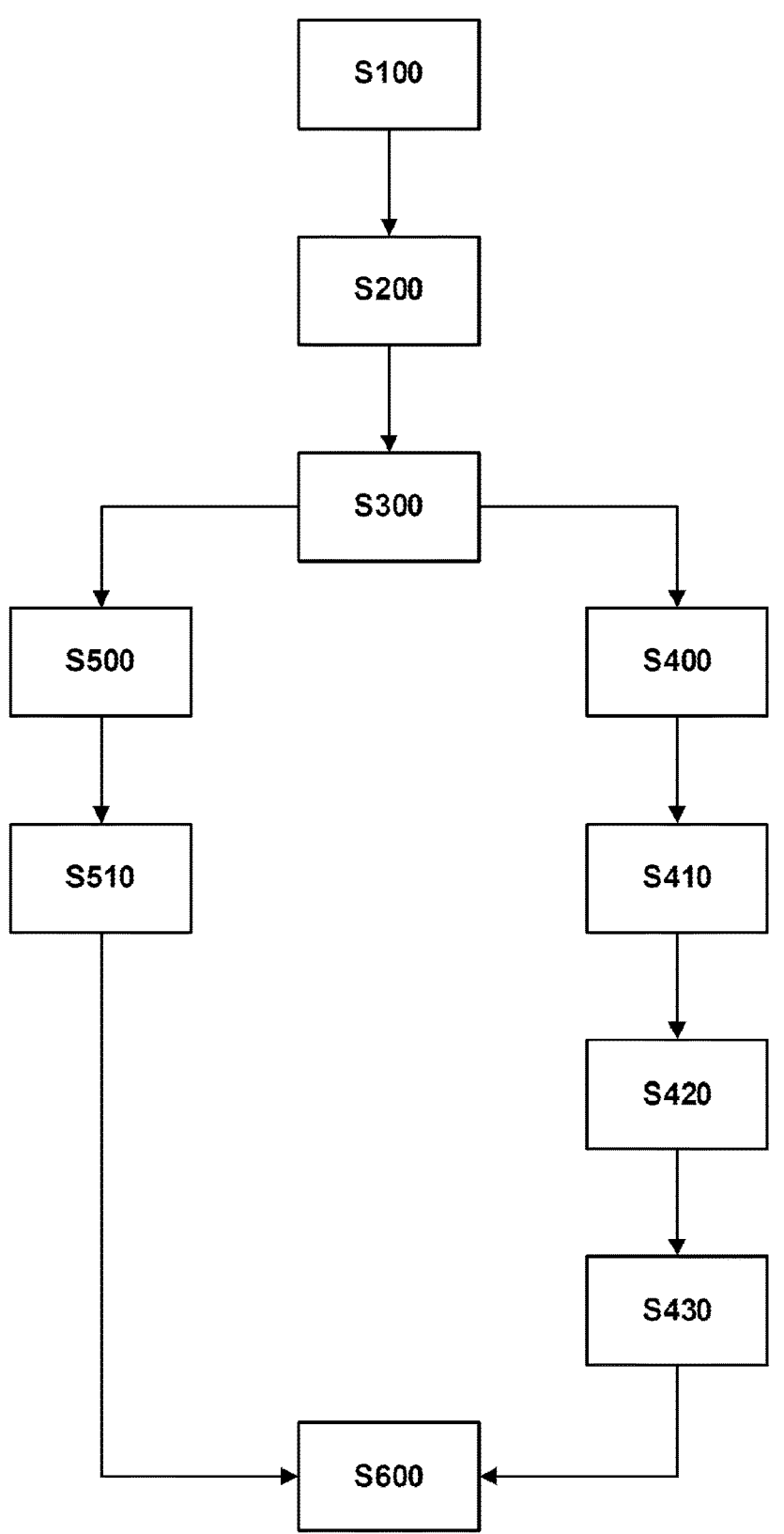

5(D) shows the resulting filter characteristic from FIG. 5(C) in comparison with the absorption characteristic of fluorophore PpIX;

FIG. 6 shows a schematic flowchart of a method according to the invention in accordance with one implementation;

FIG. 7 shows a schematic flowchart of a method according to the invention in accordance with a further implementation; and FIG. 8 shows a schematic flowchart of a method according to the invention in accordance with a further implementation.

Figure 1:
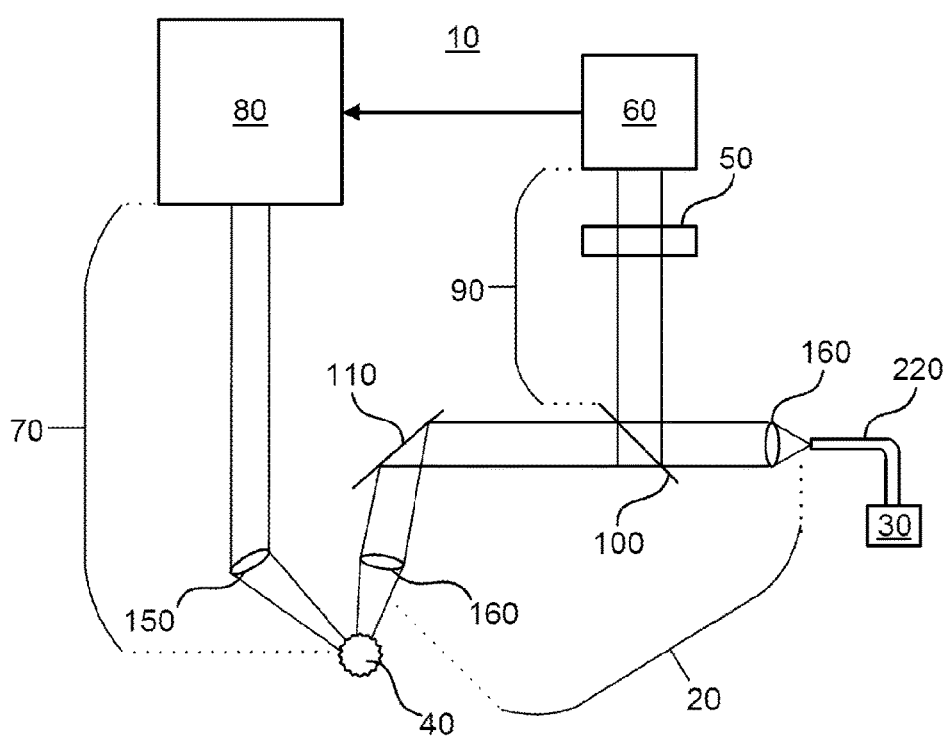
FIG. 1 shows a schematic illustration of a microscope according to the invention in accordance with one embodiment.

FIG. 1 shows a schematic illustration of a microscope 10 according to the invention in accordance with a first embodiment.

The surgical microscope 10 has a light source 30, which is embodied by a broadband, non-monochromatic LED. The light from the light source 30 is radiated via an illumination beam path 20 onto the object 40, for example onto a tissue sample 40 to be examined. The illumination beam path 20 comprises an optical waveguide 220, into which the excitation radiation from the light source 30 is coupled. The light from the light source 30 is coupled here efficiently into the optical waveguide 220 by means of an optical unit. The illumination beam path 20 can furthermore have a multiplicity of optical and mechanical components which are known in principle. For example, the illumination beam path 20 has an optical collector in the form of a lens 160, which collimates the radiation from the light source 30 emerging from the optical waveguide 220. This radiation is then radiated onto the object 40, possibly by using further optical components, such as the deflection mirror 110.

The surgical microscope 10 is designed for fluorescence imaging. To this end, the surgical microscope 10 comprises, in addition to the illumination beam path 20, an observation beam path 70 via which radiation emitted by the object 40 is imaged onto an image generating means 80 and is detected there. The observation beam path 70 can likewise have a multiplicity of optical and mechanical components that are known in principle, for example an objective 150 in the form of a lens, which guides the emitted radiation of the object 40 onto a detector contained in the image generating means 80. The image generating means 80 is configured to generate an image from the radiation that is emitted by the object 40 and is guided in the observation beam path 70.

The microscope 10 is calibrated before its use preferably with previously known illumination settings. Preferably, a reference sample emitting in a predefined manner is used in the calibration. Using the calibration, influences of the imaging optical system can be compensated. During the operation of the microscope 10, changes in the light source 30 can, however, despite the prior calibration, result in faulty fluorescence imaging, for example an incorrect intensity of detected regions, and consequently for example in faulty tumor detection or tumor representation.

It has been found by the inventors that a temporal variation in the excitation radiation has a significant influence on the generation of the fluorescence images. This is true in particular for fluorescence images in which the grayscale values (brightness values) of the fluorophore contained in the tissue due to the excitation are determined. Here, even a small variation in the excitation radiation in the relevant wavelength range can result in a significant deviation of the fluorescence intensity. This is the case in particular for the medically approved fluorophores that are frequently used in fluorescence imaging, such as protoporphyrin IX (PpIX), fluorescein and indocyanine green (ICG).

It is the concept of the present invention to bring about a temporal variation in the excitation radiation by simple and cost-effective means.

For this purpose, provision is made to provide, in addition to the illumination beam path 20 and the observation beam path 70, a measurement beam path 90, which is configured to guide a part of the excitation radiation out of the observation beam path 70 onto a sensor 60. In the first exemplary embodiment, a part of the excitation radiation is to this end guided into the measurement beam path 90 by means of the partially transmissive mirror 100. It is preferred here for the beam splitter 100 (partially transmissive mirror) to guide more than 90% (particularly preferably more than 98% and with further preference more than 99%) of the (power of the) excitation radiation further in the illumination beam path 20, while at most 10% (particularly preferably at most 2% and with further preference at most 1%) (of the power) of the excitation radiation are deflected into the measurement beam path 90.

The sensor 60 is designed for detecting at least one optical property of the excitation radiation. With particular preference, this is a means for detecting the intensity (light intensity or illuminance) of the excitation radiation guided in the measurement beam path 90. For example, the sensor 60 may be embodied in the form of a photodiode. The signal of the sensor 60, which corresponds to, for example, the intensity of the excitation radiation guided in the measurement beam path 90, is then fed to the image generating means 80 and taken into consideration in the image generation. In this way, a temporal variation of the excitation radiation is compensated and a variation in the intensity of the excitation radiation during fluorescence imaging is computationally eliminated.

The sensor 60, which is sensitive over a specific wavelength range, integrates the intensity over the specific wavelength range during the detection of the intensity (light intensity) of the excitation radiation guided in the measurement beam path 90. In this way, a wide variety of wavelength portions of the broadband light source 30 (corresponding to a characteristic of the sensor 60) have influence on the signal generated by the sensor 60. For this reason, the invention makes provision for an optical filter 50 to be arranged upstream of the sensor 60 to increase the accuracy of the image generation. In this case, the optical filter 50 is configured to select predefined parts of the excitation radiation.

In this way, the effective excitation energy for the fluorophore contained in the object 40 is determined by means of the combination of a light sensor 60 with a filter 50 that is matched to the application. The characteristic 210 (here: spectral transmission) of the filter 50 preferably corresponds to the absorption properties 190 of a fluorophore contained in the tissue (cf. FIG. 5) or to the proportions of the absorbed light that contribute to the fluorescence (effective absorption). Preferably, medically approved fluorophores such as for example protoporphyrin IX (PpIX), fluorescein and indocyanine green (ICG) are used. The optical filter 50 in the exemplary embodiment is embodied in the form of a transmission filter, but the present invention is not limited thereto, and the optical filter 50 can alternatively be designed for example as a reflection filter.

By means of a signal (of the sensor 60) that is generated by the combination of filter 50 and sensor 60 and corresponds to the excitation of the fluorophore used, the varying influences of the illumination on the fluorescence imaging can be compensated mathematically with a high level of accuracy. It is preferred here to take into account further influencing factors in the filter characteristic 210.

According to a preferred embodiment variant, the filter characteristic 210, that is to say the (transmission) spectrum of the filter 50, corresponds to an envelope of the absorption spectrum 190 of a fluorophore contained in the sample 40. This is illustrated in FIG. 5(A), for example. The envelope is understood here to mean any characteristic of the filter 50 whose deviation per (each) wavelength is less than 15%, preferably less than 10% and with further preference less than 5%. In this case, both the spectrum of the filter 50 and the absorption spectrum of the fluorophore at its maximum should be normalized in each case to 100%. With further preference, all normalized values of the envelope are greater than or equal to the corresponding values of the absorption spectrum of the fluorophore. With further preference, the area under the (normalized) absorption spectrum of the fluorophore is at most 15% smaller, preferably at most 10% smaller and with further preference at most 5% smaller, than the area under the (normalized) envelope.

A further significant factor is the wavelength-dependent detection characteristic of the sensor 60 used (cf. FIG. 5(B)). For this reason, provision is preferably made for a detection characteristic 191 of the sensor 60 (inverse) to be further-more taken into account in the filter characteristic 210, in addition to the absorption properties 190 of a fluorophore contained in the tissue. In this way, the accuracy of the image generation can be further increased despite a varying light source 30. This is illustrated in FIG. 5(B), according to which the filter characteristic 210 is based on the math-ematical convolution of the absorption spectrum 190 with the inverse detection characteristic 191.

With further preference, the excitation efficiency of the fluorophore used per wavelength, tissue properties of the object 40 and/or the optical properties of the optical ele-ments in the excitation beam path are additionally (or alternatively) used for the filter characteristic 210, such as for example the transmission properties of the optical sur-faces used in the microscope 10 or of a light guide. This ensures that the sensor 60 generates a signal that, with a high level of accuracy, is equivalent to the expected absorbed power exciting fluorescence and independently of the irra-diated spectrum. Such a filter characteristic 210 is shown in FIG. 5(C), according to which the filter characteristic 210 is based on the mathematical convolution of the absorption spectrum 190 with the inverse detection characteristic 191, a transmission characteristic 192 of a light guide (for example light guide 220), and a transmission characteristic 193 of a beam splitter (for example beam splitter 100). In deviation from the illustrations in FIGS. 5(B) and (C), the filter characteristics could also correspond to the envelopes of the mathematical convolutions of the components.

In order to achieve cost-effective compensation, the sen-sor 60 is preferably embodied in the form of a single-channel detector or of a detector having a number of channels that is reducible (to one). In this way, the use of cost-intensive components such as spectrometers and the like can advan-tageously be avoided. A detector (sensor 60) that can be used can preferably be photocells, photodiodes, pin-photodiodes, avalanche photodiodes, MSM photodiodes, phototransistors and photoresistors.

In order to be able to use efficiently a variety of fluoro-phores, a preferred embodiment variant makes provision for a filter wheel having a plurality of filters and a broadband single-channel sensor to be used. Broadband means that the sensor has a sensitivity of more than 10% (of its maximum sensitivity) in a wavelength range of greater than 100 nm, preferably greater than 200 nm and with further preference greater than 400 nm. Alternatively, it is preferred to provide a plurality of sets (combinations) of different sensors 60 and different filters 50, which can be used in the microscope 10. These sets are part of the microscope 10 and can be selected by a user by way of switching. With different sets, both objects having different fluorophores and objects having only one fluorophore can be examined (for example by means of different sensor-filter combinations for the left flank and the right flank of the (effective) absorption spec-trum of the fluorophore).

To compensate the stated influences, in particular the temporal variation in the intensity of the light source 30, the generated signal value of the sensor 60 (for example the current of a photodiode) is preferably used for an excitation power calibration of the light source (current adaptation) or a representation adaptation during fluorophore detection, that is to say the image generation.

According to one preferred embodiment variant, a beam homogenizer is provided, for example an integrating sphere, which is arranged preferably upstream of the sensor 60 and downstream of the beam splitter 100.

Figure 2:
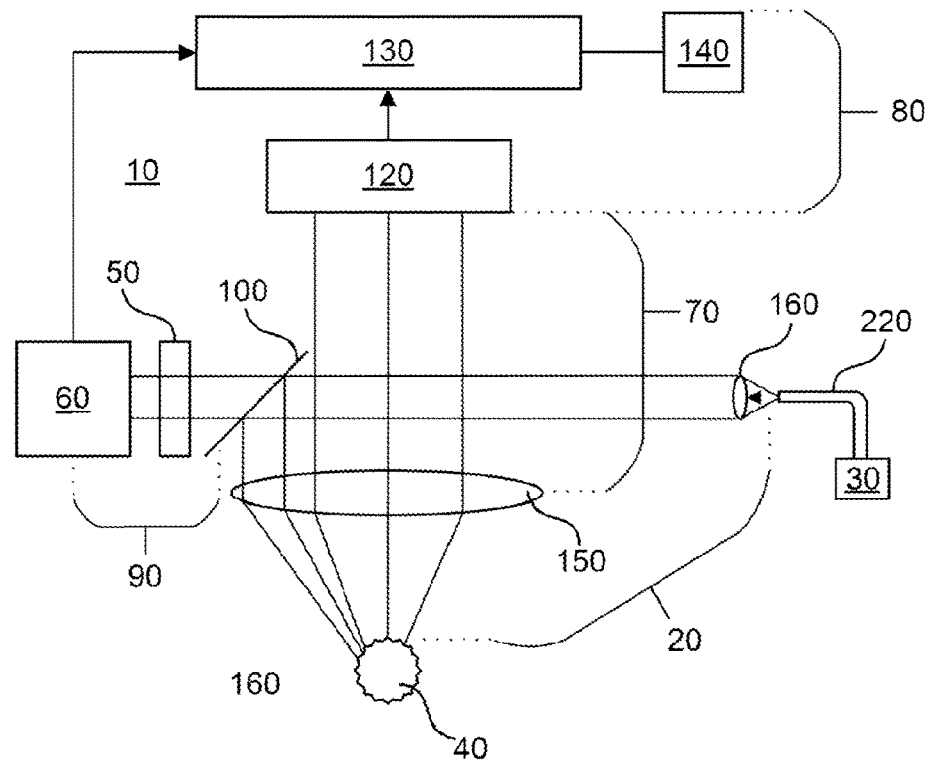
FIG. 2 shows a schematic illustration of a microscope according to the invention in accordance with a further embodiment.

FIG. 2 shows a schematic illustration of a microscope 10 according to the invention in accordance with a further embodiment.

The light from the light source 30 is initially guided via an optical waveguide 200, collimated by means of a lens 160, and guided to a beam splitter 100. A small part (approximately 1%) of the excitation radiation passes through the beam splitter 100 and then through the filter 50 to the sensor 60. The filter 50, as has already been explained, allows only that part of the excitation radiation through that is relevant for exciting the fluorophore used. Furthermore, by using the filter 50, the wavelength-dependent detection characteristic of the sensor 60 is taken into account, wherein the present invention is not limited thereto. Rather, it would be possible as an alternative to only allow the excitation radiation that is relevant for exciting the fluorophore used to pass through the filter.

A large part (approximately 99%) of the excitation radia-tion is deflected by the beam splitter 100 onto the objective 150, which in the present exemplary embodiment is both a part of the illumination beam path 20 and also a part of the observation beam path 70. The excitation radiation is now imaged onto the object 40 to be examined, as a result of which the fluorophore (fluorophores) contained in the object 40 (tissue to be examined) is (are) excited to emit fluores-cence. The radiation that is absorbed and (re-)emitted by the object in this way (in addition to scattered and/or reflected portions) is imaged by means of the objective 150 (and any further optical components present) onto a camera 120, which acquires an image of the radiation emitted by the object. The image acquired by the camera 120 and the signal value determined by the sensor 60 are guided to an evalu-ation unit 130 and processed. As has already been explained, the generated signal value of the sensor 60 is used to adapt the image generated by the camera 120. Alternatively or additionally, the signal value is used for a power adaptation of the light source. The adapted image, in which variations of the excitation radiation have been compensated, is dis-played on a display 140 and can thus be used by a surgeon.

Figure 3:
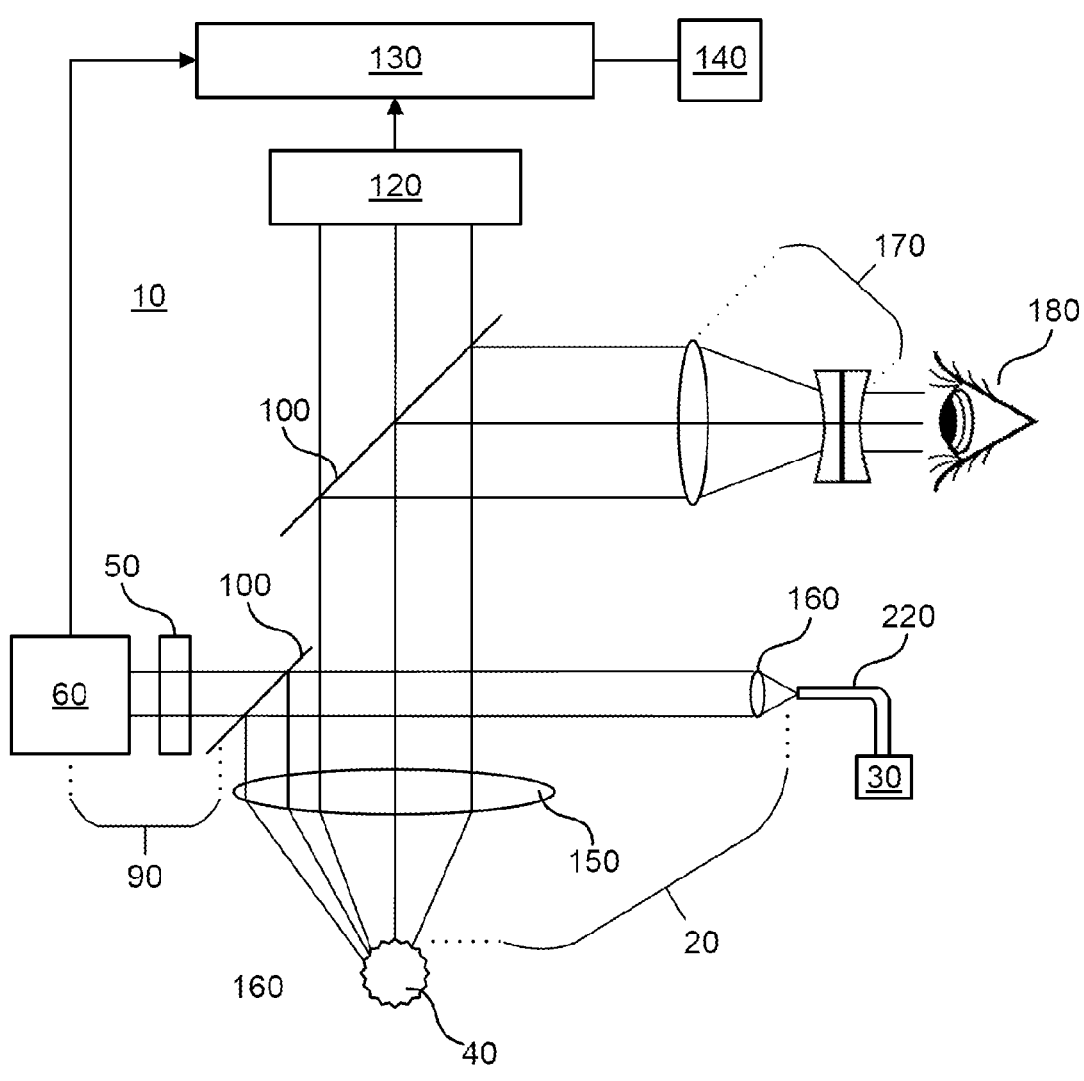
FIG. 3 shows a schematic illustration of a microscope according to the invention in accordance with a further embodiment.

FIG. 3 shows a schematic illustration of a microscope 10 according to the invention in accordance with a further embodiment.

In this embodiment, in addition to the embodiment of FIG. 2, a further beam splitter 100 is provided in the observation beam path 70, which beam splitter enables a further image of the object, in addition to the image that is acquired by the camera 120, generated by the evaluation unit 130 and displayed by the display 140, to be displayed without computational compensation. To this end, a part of the radiation emitted by the object is coupled out and imaged via an eyepiece. This image can then likewise be used by a surgeon. The possibility of simultaneously generating two images can represent an additional aid to making decisions for the surgeon.

Figure 4:
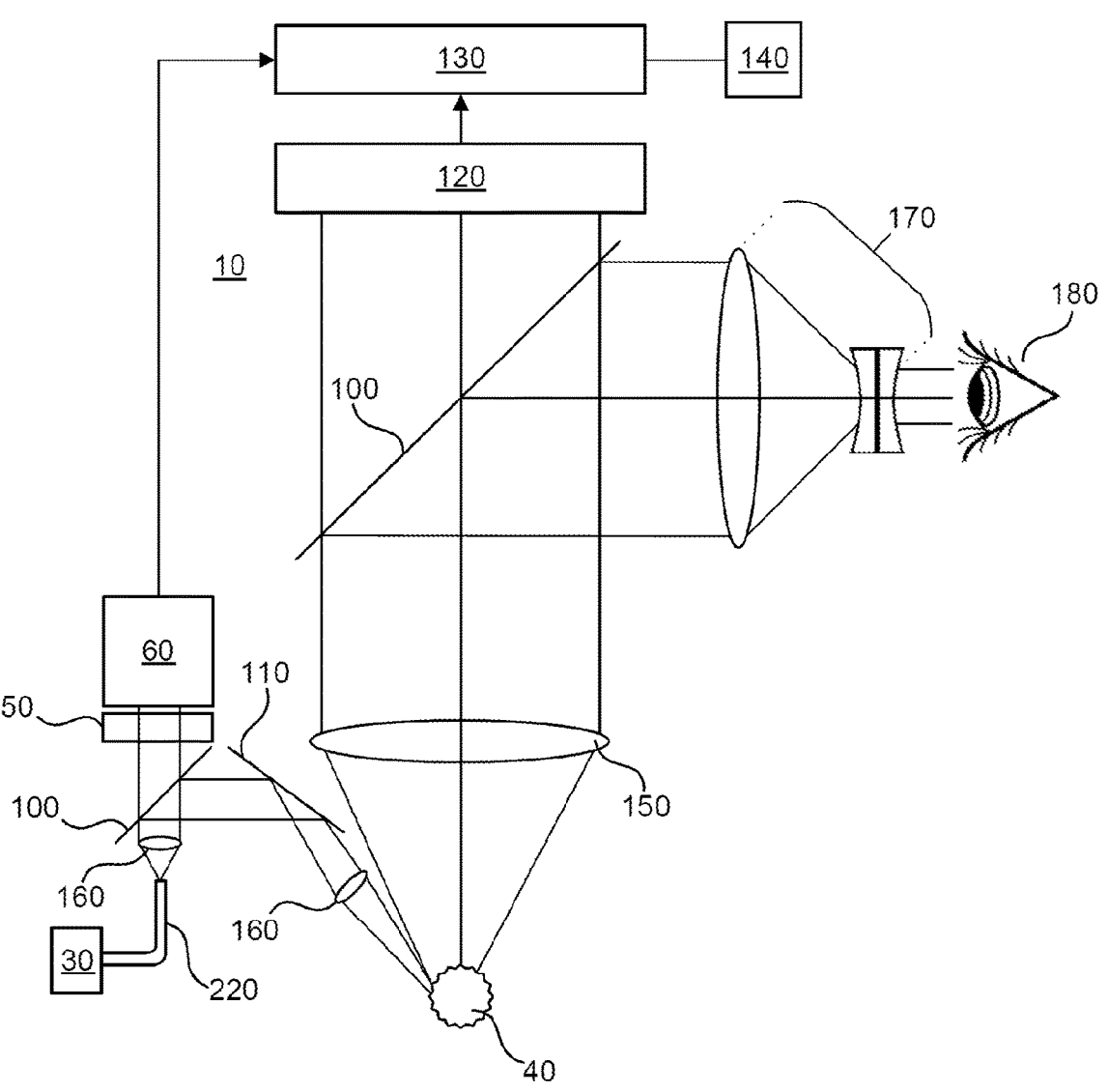
FIG. 4 shows a schematic illustration of a microscope according to the invention in accordance with a further embodiment.

FIG. 4 shows a schematic illustration of a microscope 10 according to the invention in accordance with a further embodiment.

In this embodiment, the measurement beam path 90 is not coupled out of the illumination beam path 20, but comes before the illumination beam path 20. After a part of the excitation radiation has been coupled out into the measurement beam path (in the direction of the filter 50 and sensor 60) by means of the beam splitter 100, the excitation light in the illumination beam path is focused at the object 40 with the aid of a deflection mirror 110 and a lens 160. Regarding the rest, the embodiment of FIG. 4 corresponds to the embodiment of FIG. 3. The position of the filter 50 and of the sensor 60 is variable in principle (within the microscope 10) as long as it is ensured that at least a part of the excitation radiation initially passes through the filter 50 and then reaches the sensor 60. According to a preferred embodiment variant, the filter 50/sensor 60 are arranged close to the tissue (object 40) to be examined (there are less than three, preferably less than two, beam shaping surfaces from the beam splitter to the object), because in this case more influences of the microscope 10 are already imaged in the light signal of the light source 30. As long as the filter 50/sensor 60 are arranged directly at or near the light source 30, an auxiliary light source (with little power) can be additionally provided in order to nevertheless be able to capture the temperature influence and light-guide influence.

FIG. 5 shows schematic illustrations of characteristics of the optical filter 50 used in the microscope 10 according to the invention in accordance with a plurality of embodiments. As already explained above, the radiation 200 generated by the broadband light source 30 is filtered by means of the filter characteristic 210 before said filtered excitation radiation is then incident on the sensor 60. In FIGS. 5(A) to 5(C), the spectrum of the light source, for example of the light source 30, is illustrated for elucidation purposes in a manner such that the light source emits in four different spectral ranges of identical illuminance and otherwise emits no or only very little light.

In the exemplary embodiment illustrated in FIG. 5(A), the filter characteristic 210 corresponds to an envelope of the absorption spectrum 190 of protoporphyrin IX (PpIX), as a result of which the excitation radiation in the range of approximately between 360 nm and 440 nm (the two spectral ranges emitted by the light source having smaller wavelengths) can pass through entirely, while the excitation radiation in the range of larger wavelengths (the two spectral ranges emitted by the light source having larger wavelengths) is nearly entirely eliminated and therefore is not incident on the sensor 60.

In the exemplary embodiment illustrated in FIG. 5(B), the filter characteristic 210 is based on the absorption spectrum 190 of protoporphyrin IX (PpIX) and the characteristic 191 (of the spectral sensitivity) of the sensor 60. The filter characteristic 210 is preferably based on a convolution of the absorption spectrum 190 of protoporphyrin IX (PpIX) with the inverse characteristic of the sensor 60. Taking into account the detection characteristic 191 of the sensor 60 shows that even fewer spectral portions of the excitation light effectively contribute to the excitation of fluorescence. In particular, only the spectral range emitted by the light source having the lowest wavelengths still entirely contributes to the fluorescence of PpIX.

In the exemplary embodiment illustrated in FIG. 5(C), the filter characteristic 210 is based on the absorption spectrum 190 of protoporphyrin IX (PpIX), the characteristic 191 (of the spectral sensitivity) of the sensor 60, the transmission characteristic 192 of a light guide (for example light guide 220), and the reflection and transmission properties 193 of a beam splitter (for example beam splitter 100). The optical properties of the beam splitter 100 should be taken into account both with regard to the light that has been deflected onto the sensor 60 and also with regard to the light that has been transmitted onto the object 40. With preference, the filter characteristic 210 is based on a convolution of the absorption spectrum 190 of protoporphyrin IX (PpIX) with the inverse characteristic of the sensor 60, the transmission characteristic of a light guide 192, and the reflection and transmission properties 193 of a beam splitter. Taking into account the optical properties of the beam splitter leads to actually even fewer spectral portions of the excitation light effectively contributing to the excitation of fluorescence. In particular, even the spectral range emitted by the light source having the lowest wavelengths still contributes to the fluorescence of PpIX only to a negligible extent. In deviation from the illustrations in FIGS. 5(B) and (C), the filter characteristics could alternatively also correspond to the envelopes of the mathematical convolutions of said components.

Figure 5D:
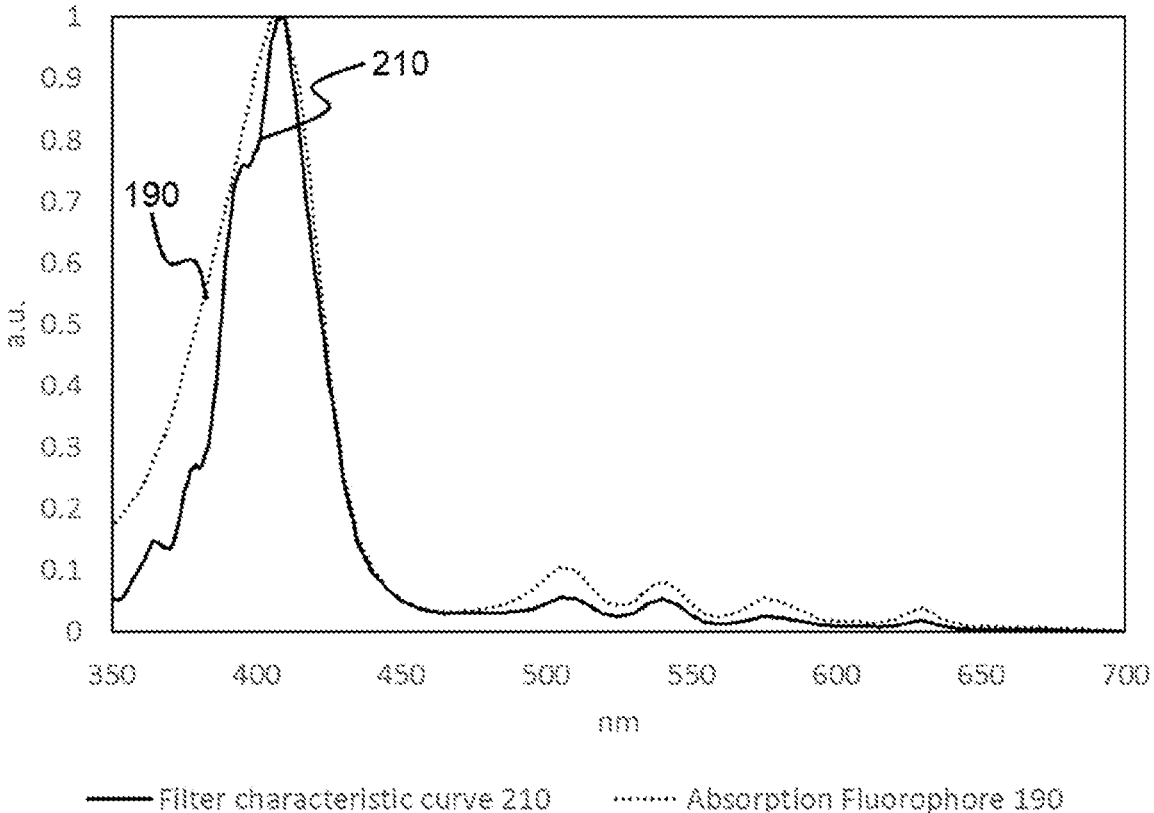

To illustrate more clearly the influence the taking account of further optical components in the illumination beam path 20 has on the filter characteristic 210, FIG. 5(D) shows the resulting filter characteristic 210 from FIG. 5(C) in comparison with the absorption characteristic 190 of the fluorophore PpIX. Taking into account further optical components in the illumination beam path 20 thus advantageously enables the selection of the excitation radiation that effectively contributes to fluorescence with a greater level of precision.

FIG. 6 shows a schematic flowchart of a method according to the invention in accordance with a first implementation.

In step S100, broadband excitation radiation is generated by the light source 30. This broadband excitation radiation is then, in step S200, coupled onto an object 40 to be investigated, wherein the object 40 preferably contains at least one substance that is designed to excite fluorescence. However, the invention is not limited to surgical microscopes 10 for fluorescence imaging; rather, it would be possible to also use the microscope according to the invention for image generation without fluorescence imaging. In step S300, a part of the excitation radiation is coupled out into a measurement beam path 90. In this measurement beam path, in step S400, specific wavelengths of the coupled-out excitation radiation is selected (filtered) by means of a filter 50. In step S410, the intensity of the filtered excitation radiation is subsequently detected by means of the sensor 60, and a signal value therefor is generated. By means of the signal (of the sensor 60) that is generated by the combination of filter 50 and sensor 60 and corresponds to the excitation of the fluorophore used, varying influences of the illumination on the fluorescence imaging can be compensated with a high level of accuracy. It is preferred here to take into account further influencing factors in the filter characteristic 210.

In step S500, the radiation emitted by the object 40 is imaged for example onto the camera 120 and detected there in step S510, for example by a CMOS sensor or a CCD sensor installed in the camera 120. Next, an image of the object 40 is generated, for example by means of the evaluation unit 130. The image is generated here by using the detected, imaged radiation and by using the detected optical property of the filtered excitation radiation.

FIG. 7 shows a schematic flowchart of a method according to the invention in accordance with a second implementation. In contrast to the implementation of FIG. 6, the step S300 of coupling out part of the excitation radiation is performed temporally before the step S200 of coupling the excitation radiation onto the object 40 to be examined, as is provided for example in the embodiment of FIG. 4.

FIG. 8 shows a schematic flowchart of a method according to the invention in accordance with a further implementation.

This implementation furthermore comprises step S420, in which an effective signal value for the excitation of the object 40 to be examined is determined and transmitted to the evaluation unit 130. Next, in step S430, the determined signal value is compared with a reference value ascertained previously (before the actual use of the microscope) in a calibration step (with a reference sample). Finally, the image is then generated (in step S600) by using the detected, imaged radiation and by using the comparison between the reference value and the detected optical property (signal value of the sensor 60) of the filtered excitation radiation. In a particularly preferred embodiment variant, a linear adaptation of the image brightness is performed, that is to say the detected brightness is adapted in terms of the ratio of signal value of the sensor 60 to the reference value.

LIST OF REFERENCE SIGNS

10 Microscope
20 Illumination beam path
30 Light source
40 Object
50 Optical filter
60 Optical sensor
70 Observation beam path
80 Image generating means
90 Measurement beam path
100 Beam splitter
110 Deflection mirror
120 Camera
130 Evaluation unit
140 Display
150 Objective
160 Lens
170 Eyepiece
180 Eye of an observer
190 Absorption spectrum of the object
191 (Inverse) sensor characteristic
192 Transmission characteristic of an optical waveguide
193 Reflection and transmission characteristic of a beam splitter
200 Spectrum of the excitation radiation
210 Characteristic of the optical filter
220 Optical waveguide
S100 Generating excitation radiation
S200 Coupling the excitation radiation onto an object to be examined
S300 Coupling part of the excitation radiation out S400 Selecting specific wavelengths of the coupled-out excitation radiation
S410 Detecting the intensity of the filtered excitation radiation
S420 Determining the effective value for the excitation of the object to be examined
S430 Comparing the determined value with a reference value
S500 Imaging the radiation emitted by the object
S510 Detecting the imaged radiation
S600 Generating an image

The invention claimed is:

1. A microscope, comprising:
an illumination beam path which is configured to couple excitation radiation from a light source onto an object to be examined;
an optical filter, which is configured to select parts of the excitation radiation;
a sensor for detecting an optical property of the excitation radiation;
a measurement beam path, which is configured to guide a part of the excitation radiation onto the sensor;
an observation beam path, which is configured to image radiation emitted by the object;
wherein the optical filter is arranged in the beam path between the light source and the sensor, and
an image generating means, which is configured to generate an image from the radiation that is emitted by the object and is guided in the observation beam path;
wherein the image generating means is configured to use the property of the filtered excitation radiation detected by means of the sensor for the image generation in that a signal value generated by the sensor is fed to and used by the image generating means to adapt the image being generated.

2. The microscope as claimed in claim 1, wherein the filter is configured to select that spectral part of the excitation radiation that contributes to a fluorescence excitation of the object.

3. The microscope as claimed in claim 1, wherein a beam splitter is arranged in the illumination beam path, which beam splitter is configured to guide a part of the excitation radiation further in the illumination beam path and a part of the excitation radiation into the measurement beam path.

4. The microscope as claimed in claim 1, wherein the filter is embodied in the form of a bandpass filter and/or a means for light homogenization is provided in the measurement beam path.

5. The microscope as claimed in claim 1, wherein the sensor is configured to determine the intensity of the excitation radiation in the measurement beam path.

6. The microscope as claimed in claim 1, wherein the image generating means is part of a control unit that is further configured to control, by closed-loop or open-loop control, the light source and/or other components of the microscope on the basis of properties of the filtered excitation radiation detected by means of the sensor.

7. The microscope as claimed in claim 1, wherein the image generating means has a camera, and wherein the observation beam path is configured to image the object onto a light-sensitive detector plane of the camera.

8. The microscope as claimed in claim 1, wherein the image generating means comprises an evaluation unit, which is configured to use the property of the filtered excitation radiation that is detected by means of the sensor discontinuously to generate the image.

9. The microscope as claimed in claim 1, configured to detect the optical property of the excitation radiation by means of the sensor and to simultaneously generate an image by taking into account both the detected property of the filtered excitation radiation and the radiation that is emitted by the object and guided in the observation beam path.

10. The microscope as claimed in claim 8, wherein the evaluation unit is configured to compare the detected optical property of the excitation radiation with a reference value.

11. The microscope according to claim 10, wherein the evaluation unit is configured to use a ratio between the detected optical property of the excitation radiation and the reference value in order to generate the image.

12. A method for generating an image of an object, comprising:

generating excitation radiation;

coupling at least a part of the excitation radiation onto an object to be examined;

coupling a part of the excitation radiation out, wherein the coupled-out part of the excitation radiation is guided onto an optical filter;

selecting a part of the coupled-out excitation radiation by means of the optical filter;

detecting an optical property of the filtered excitation radiation by means of an optical sensor;

imaging at least part of the radiation emitted by the object;

detecting the imaged radiation;

generating an image by using the detected, imaged radiation and by using the detected optical property of the filtered excitation radiation; and adapting, using an image generating means, the image being generated.

13. The method as claimed in claim 12, further comprising:

determining an effective value for the excitation of the object to be examined;

comparing the determined value with a reference value; and generating an image by using the detected, imaged radiation and by using the comparison between the reference value and the determined effective value.

14. The method as claimed in claim 12, further comprising:

using the detected optical property of the filtered excitation radiation to control, by open-loop or closed-loop control, a light source of the excitation radiation and/or other components in a microscope used for image generation.

15. The method as claimed in claim 12, wherein a filter characteristic of the optical filter corresponds to an absorption spectrum of a fluorophore contained in the object.

* * * * *